United States Patent
Parthasarathy et al.

(10) Patent No.: US 9,838,349 B2
(45) Date of Patent: Dec. 5, 2017

(54) ZONE CLASSIFICATION OF ELECTRONIC MAIL MESSAGES

(75) Inventors: Krishna Kumar Parthasarathy, Sammamish, WA (US); Anatoliy Panasyuk, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 62 days.

(21) Appl. No.: 12/719,801

(22) Filed: Mar. 8, 2010

(65) Prior Publication Data

US 2011/0219081 A1    Sep. 8, 2011

(51) Int. Cl.
*H04L 12/58* (2006.01)
*H04L 29/06* (2006.01)
*G06Q 10/10* (2012.01)

(52) U.S. Cl.
CPC ............ *H04L 51/28* (2013.01); *H04L 51/12* (2013.01); *H04L 51/18* (2013.01); *H04L 51/22* (2013.01); *H04L 63/0236* (2013.01); *G06Q 10/107* (2013.01)

(58) Field of Classification Search
CPC ......... H04L 51/12; H04L 51/14; H04L 51/18; H04L 51/22; H04L 51/28; H04L 51/063; H04L 51/06; H04L 63/0236; H04L 12/585; H04L 12/583; G06Q 10/107
USPC ................... 709/206, 207, 203, 204
See application file for complete search history.

(56) References Cited

U.S. PATENT DOCUMENTS

| | | |
|---|---|---|
| 6,073,142 A | 6/2000 | Geiger et al. |
| 6,226,745 B1 | 5/2001 | Wiederhold |
| 6,366,912 B1 * | 4/2002 | Wallent et al. ............... 709/219 |
| 6,826,609 B1 | 11/2004 | Smith et al. |
| 6,829,613 B1 | 12/2004 | Liddy |
| 7,152,244 B2 * | 12/2006 | Toomey ......................... 726/26 |
| 7,272,853 B2 | 9/2007 | Goodman et al. |
| 7,401,356 B2 | 7/2008 | Bandini et al. |
| 7,409,540 B2 | 8/2008 | Ingerman |
| 7,409,708 B2 | 8/2008 | Goodman et al. |
| 7,464,264 B2 | 12/2008 | Goodman et al. |
| 7,467,399 B2 | 12/2008 | Nadalin et al. |
| 7,493,359 B2 | 2/2009 | Fitzpatrick |
| 7,493,650 B2 | 2/2009 | Peled |
| 7,496,634 B1 | 2/2009 | Cooley |
| 7,587,749 B2 | 9/2009 | Leser et al. |
| 7,665,131 B2 | 2/2010 | Goodman et al. |
| 7,673,344 B1 | 3/2010 | Rowney et al. |

(Continued)

FOREIGN PATENT DOCUMENTS

| | | |
|---|---|---|
| CN | 1746916 A | 3/2006 |
| CN | 1859330 A | 11/2006 |

(Continued)

OTHER PUBLICATIONS

Microsoft (Exchange Server 2010 Transport, Routing, and IPC, Jun. 16, 2008, p. 1-101.*

(Continued)

*Primary Examiner* — Gregory Todd

(57) ABSTRACT

Embodiments of the invention relate to techniques for classifying received e-mails and e-mails to be sent. In some embodiments, a set of e-mail zones may be defined and e-mails may be classified into one of the plurality of zones. An indication of the zone into which an e-mail has been classified may be displayed in a visual display of the e-mail.

20 Claims, 5 Drawing Sheets

(56) References Cited

U.S. PATENT DOCUMENTS

| | | | |
|---|---|---|---|
| 7,685,645 B2 | 3/2010 | Doyle et al. | |
| 7,861,301 B2 | 12/2010 | Fellenstein et al. | |
| 7,903,656 B2 | 3/2011 | Hondo et al. | |
| 8,126,837 B2 | 2/2012 | Stollman | |
| 8,130,951 B2 | 3/2012 | Tian | |
| 8,407,805 B2* | 3/2013 | Warrington | G06F 21/6218 709/206 |
| 8,635,285 B2* | 1/2014 | D'Amato et al. | 709/206 |
| 8,843,566 B2* | 9/2014 | Thompson | 709/206 |
| 2002/0087479 A1 | 7/2002 | Malcolm | |
| 2003/0149732 A1 | 8/2003 | Peled | |
| 2004/0078334 A1* | 4/2004 | Malcolm | G06F 21/606 705/50 |
| 2004/0111478 A1 | 6/2004 | Gross et al. | |
| 2005/0028006 A1 | 2/2005 | Leser et al. | |
| 2005/0127171 A1 | 6/2005 | Ahuja et al. | |
| 2005/0171914 A1 | 8/2005 | Saitoh | |
| 2005/0193072 A1 | 9/2005 | Chant et al. | |
| 2005/0198299 A1 | 9/2005 | Beck et al. | |
| 2005/0256960 A1* | 11/2005 | Ganesh et al. | 709/229 |
| 2005/0288939 A1* | 12/2005 | Peled et al. | 705/1 |
| 2006/0168057 A1 | 7/2006 | Warren | |
| 2006/0200530 A1* | 9/2006 | Tokuda et al. | 709/206 |
| 2006/0212464 A1 | 9/2006 | Pedersen | |
| 2007/0156820 A1 | 7/2007 | Peters | |
| 2008/0091785 A1 | 4/2008 | Pulfer et al. | |
| 2008/0120556 A1* | 5/2008 | Bedingfield | H04L 51/28 715/752 |
| 2008/0215509 A1 | 9/2008 | Charlton | |
| 2008/0289037 A1* | 11/2008 | Marman | H04L 12/585 726/22 |
| 2009/0030884 A1 | 1/2009 | Pulfer | |
| 2009/0100268 A1 | 4/2009 | Garcia et al. | |
| 2009/0113001 A1* | 4/2009 | Manning et al. | 709/206 |
| 2009/0164588 A1 | 6/2009 | D'Amato | |
| 2009/0228560 A1 | 9/2009 | Sholtis | |
| 2009/0254572 A1 | 10/2009 | Redlich et al. | |
| 2009/0319629 A1 | 12/2009 | de Guerre et al. | |
| 2010/0017487 A1 | 1/2010 | Patinkin | |
| 2010/0100616 A1* | 4/2010 | Bryson et al. | 709/223 |
| 2010/0161636 A1* | 6/2010 | Macwan et al. | 707/758 |
| 2010/0169425 A1 | 7/2010 | Kadokawa et al. | |
| 2010/0332428 A1* | 12/2010 | McHenry et al. | 706/12 |
| 2011/0219424 A1* | 9/2011 | Panasyuk et al. | 726/1 |

FOREIGN PATENT DOCUMENTS

| | | |
|---|---|---|
| CN | 101201911 A | 6/2008 |
| JP | 2003008651 A | 1/2003 |
| JP | 2003173284 A | 6/2003 |
| JP | 2004-513460 A | 4/2004 |
| JP | 2004-302569 A | 10/2004 |
| JP | 2006107454 A | 4/2006 |
| JP | 2006313434 A | 11/2006 |
| JP | 2007-102334 A | 4/2007 |
| JP | 2007214979 A | 8/2007 |
| JP | 2007-267248 A | 10/2007 |
| JP | 2007-293635 A | 11/2007 |
| JP | 2009258852 A | 11/2009 |
| JP | 2011-502308 A | 1/2011 |
| KR | 1020070000506 | 1/2007 |
| RU | 2378692 C2 | 1/2010 |
| WO | 2009011807 A1 | 1/2009 |

OTHER PUBLICATIONS

Using Classifications to Manage Email Policy for the Enterprise, published May 2007; http://www.vigilsoftware.com/Website/Titus/whitepapers?titus_ManageEmailPolicyEnterprise.pdf.

Tracking Email Reputation for Authenticated Sender Indentities, published Aug. 2-3, 2007; http://www.ceas.cc/2008/papers/ceas2008-paper-22.pdf.

Information Protection and Control, published 2009; http://www.microsoft.com/exchange/2010/en/us/information-protection-and-control.aspx.

Message Classification for Outlook Web Access, published 2008; http://www.titus-labs.com/software/tms_owa.html.

International Search Report and Written Opinion of the International Searching Authority regarding Application No. PCT/US2011/027235 dated Oct. 18, 2011.

International Search Report and Written Opinion regarding Application No. PCT/US2011/026898 dated Nov. 11, 2011.

Office Action from the United States Patent Office regarding U.S. Appl. No. 12/718,843 dated Jun. 28, 2012.

Office Action from the United States Patent Office regarding U.S. Appl. No. 12/718,843 dated Oct. 25, 2012.

Office Action from the State Intellectual Property Office of the People's Republic of China regarding Application No. 201180012316.7 dated Feb. 28, 2013.

Fari, "Enterprise Content Management in Regulated Industries", retrieved from <<http://download.microsoft.com/download/4/2/c/42c19292-ddc6-4d8f-82fe-be99e557c04e/Content%20Management%20in%20Regulated%20Industries%20-%20a%20Microsoft/%20Approach.doc>>, Microsoft Corporation, Published Jun. 2006.

Securosis Blog, "Information-Centric Security Tip: Know Your Users and Infrastructure", retrieved from <<http://securosis.com/blog/information-centric-security-tip-know-your-users-and-infrastructure/>> on Jan. 5, 2010.

Symantec, "Symantec Data Loss Prevention—Information Security and Employee Communication Best Practices", retrieved from <<http://www.symantec.com/connect/sites/default/files/LP_Employee_Communications_Guidelines_v3.pdf>>, Symantec, Inc., Published Feb. 2009.

Secureit, "Sensitive Data Classification and Protection", retrieved from <<http://www.secureit.com/resources/WP_Data_Class_and_Protect.pdf>> on Date Jan. 5, 2010, SecureIT, Copyright 2008.

Office Action from the Australian Intellectual Property Office regarding Application No. 2011223614 dated Apr. 24, 2014, 3 pages.

Office Action from the United States Patent Office regarding U.S. Appl. No. 12/718,843 dated Jul. 5, 2013.

Fulay, "Using Active Directory Rights Management Services and Microsoft Exchange to Protect Sensitive E-mail Communication", Microsoft Tech.ed North America, SIA 324, May 11-15, 2009, pp. 67.

Atreya, "Protect Against Information Leaks with Microsoft Active Directory Rights Management Services and RSA Data Loss Prevention Solutions", Microsoft Tech.ed North America, SIA 311, May 11-15, 2009, pp. 41.

Office Action from the Australian Intellectual Property Office regarding Application No. 2011223614 dated Feb. 21, 2014, 3 pages.

Office Action from the United States Patent Office regarding U.S. Appl. No. 12/718,843 dated Apr. 11, 2014, 15 pages.

Extended European Search Report from the European Patent Office regarding Application No. 11753843.9 dated Dec. 10, 2013, 6 pages.

Office Action from the United States Patent Office regarding U.S. Appl. No. 12/718,843 dated Sep. 8, 2014, 12 pages.

McClean et al., "Active Directory Component Jigsaw", Technet Magazine, poster, Mar.-Apr. 2006, retrieved from <<http://www.microsoft.com/en-us/download/confirmation.aspx?id=16196>> on Aug. 22, 2014, 1 page.

Office Action regarding Chinese Patent Application No. 201180012970.8, Mailed On: Feb. 28, 2015, 3 Pages.

Office Action regarding Japanese Patent Application Number 2012557084, Mailed On: Dec. 17, 2014, 11 Pages.

Second Office Action Issued in Chinese Patent Application No. 201180012970.8, Mailed Date: Nov. 2, 2015, 10 pages.

* cited by examiner

ZONE CLASSIFICATION OF ELECTRONIC MAIL MESSAGES

BACKGROUND

Electronic mail (e-mail) is a well-known system for exchanging electronic messages. While the use of e-mail as a method of communication has rapidly increased, there are a number of phenomena that can limit the usefulness of e-mail.

One such phenomenon is spamming. Spamming is sending, in large quantities, unsolicited commercial e-mails. An e-mail recipient may receive a large number of "spam" e-mails, which can present a challenge to a user in discerning important e-mails from spam.

Another such phenomenon is e-mail bombing. E-mail bombing is sending a large volume of messages to a single e-mail address in an effort to render it unusable and/or cause the e-mail server to fail.

A third such phenomenon is transmitting viruses or worms via e-mail. Such viruses and worms can take malicious action on an unwitting recipient's computer and cause data loss, system unavailability, or other detriments.

In addition to the above-discussed phenomenon, e-mail also presents the risk that confidential information included in an e-mail message may be received by an unintended recipient. For example, when sending confidential information via e-mail, the sender may accidentally send the e-mail to the wrong person, such that someone who is not authorized to view the confidential information receives it. Moreover, when confidential information sent via e-mail is not encrypted, there is a risk that the confidential information may be maliciously intercepted by someone who is not authorized to have access to the information.

SUMMARY

The inventors have recognized that classifying received e-mails and e-mails to be sent using an enterprise-wide classification scheme provides a number of benefits. First, such classification enables e-mail recipients to easily differentiate between e-mails that are trusted and those that may present a security threat, and to easily determine when he or she may be unintentionally addressing an e-mail to an unintended recipient. Second, classifying e-mails in this way enables a uniform security policy with respect to e-mails to be applied across the enterprise.

Thus, some embodiments are directed to classifying e-mails into one of a plurality of pre-defined e-mail zones. When an e-mail is received, the e-mail may be classified into one of the plurality of zones and information may be added to the e-mail header identifying the zone into which it has been classified. When the e-mail is displayed, information identifying this zone (e.g., an icon, text label, or other information) may be displayed such that the zone into which the e-mail is classified is apparent to the user.

In some embodiments, when an e-mail is being composed to be sent, the e-mail may be classified based upon the recipient e-mail address(es) in the e-mail, and information may be displayed in the e-mail indicating the zone into which the e-mail is classified.

One embodiment is directed to a method performed by an electronic mail (e-mail) client application program executing on a computer having at least one tangible memory that stores processor-executable instructions for the client application program and at least one processor that executes the processor-executable instructions. The method comprises: receiving an e-mail message from an e-mail server that identifies an e-mail address associated with the client application program as an intended recipient, the e-mail message including classification information identifying one of a plurality of pre-defined e-mail zones into which the e-mail message has been classified; accessing the classification information from the e-mail message; determining, from the classification information, the one of the plurality of pre-defined e-mail zones in which the e-mail message has been classified; accessing policy information stored in the at least one tangible memory to determine whether any policy action is to be performed in connection with the e-mail message; when it is determined that a policy action is to be performed in connection with the e-mail message, performing the policy action; and visually displaying the e-mail message, wherein the visual display of the e-mail message includes at least one indication of the one of the plurality of pre-defined e-mail zones into which the e-mail message has been classified.

Another embodiment is directed to at least one computer-readable medium encoded with processor-executable instructions for an e-mail server application program that, when executed on a computer having at least one tangible memory and at least one processor perform a method comprising: receiving an e-mail message; accessing a set of classification rules; based on the set of classification rules, classifying the e-mail message into one of a plurality of predefined e-mail zones; adding to the e-mail message information identifying the one of the plurality of pre-defined e-mail zones; and transferring the e-mail message to an e-mail client associated with an intended recipient of the e-mail message.

A further embodiment is directed to a computer having at least one tangible memory that stores processor-executable instructions for an e-mail client application program and at least one processor that executes the processor-executable instructions to: receive user input specifying at least one recipient e-mail address for an e-mail message to be sent; send the at least one recipient e-mail address to at least one e-mail server; and in response to sending the at least one recipient e-mail address, receive at least one zone classification indicating one of a plurality of pre-defined zones into which the e-mail message is classified.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized that because some e-mails may be unwanted (e.g., spam e-mails) or may be malicious, and some e-mails may include confidential information, it may desirable to identify such e-mails and apply policy to them so that they are handled in an appropriate way.

The inventors have recognized that by defining a zone classification scheme for e-mails in which each a number of mutually exclusive e-mail zones are defined and each e-mail that is received is classified into exactly one of these e-mail zones, a policy may be associated with each e-mail zone which is applied to every e-mail classified into that zone.

While some existing systems perform classification of e-mail, the classifications into which e-mail messages are classified are abstract and difficult for users and/or administrators to understand. The inventors have recognized that defining zones that relate to real-world constructs (e.g., "Trusted Partners" or "Internal Company") enables users to more easily understand and explain the classification of e-mails.

The inventors have further recognized that there are benefits to applying the same zone classification scheme across an entire enterprise or organization, so that the same e-mail zones, classification rules, and policy are applied for each e-mail user in the organization. In this way, information about what the available e-mail zones into which an e-mail may be classified are, why a particular e-mail has been classified into a particular zone, and why a particular policy action has been taken with respect to a particular e-mail may be shared and/or made available to the users.

Figure 1:
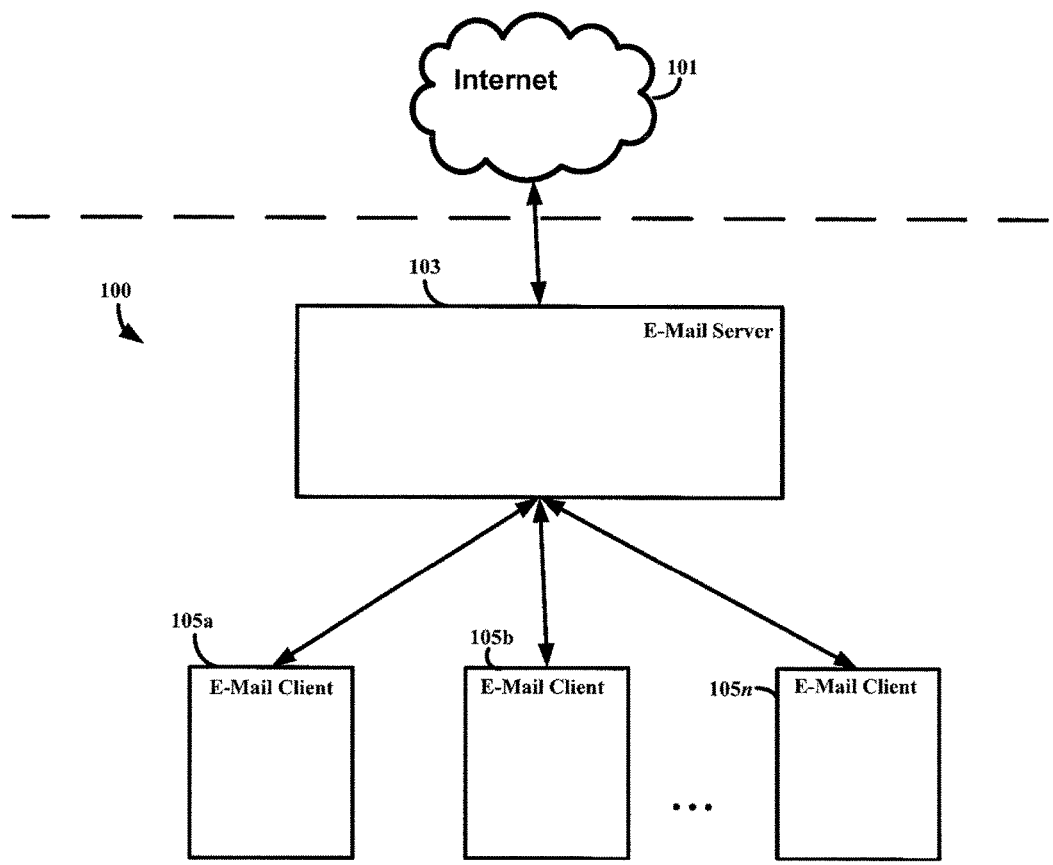
FIG. 1 is a block diagram of a computer system in which some embodiments of the invention may be implemented.

FIG. 1 shows an enterprise 100 comprising an e-mail server 103 and a plurality of clients 105a, 105b, . . . , 105n. E-mail server 103 receives e-mail messages sent from senders external to the enterprise via internet 101 and receives e-mail messages from sent from senders internal to the enterprise (e.g., clients 105). E-mail server 103 sends e-mails received from external senders to their intended internal recipients, and sends e-mails received from internal senders to their intended internal recipients or to their intended external recipients via internet 101.

As discussed above, embodiments of the invention employ a zone classification scheme to classify e-mails sent from and received by an enterprise into one of a plurality of e-mail zones, and, if warranted, take policy action based on the classification. As discussed in detail below, the classification of e-mails into zones and the taking of policy actions may be performed by the e-mail server (e.g., e-mail server 103 in FIG. 1), by an e-mail client (e.g., clients 105 in FIG. 1), or by the e-mail server and e-mail client in combination.

Any suitable set of e-mail zones may be used to classify e-mails. In some embodiments, a default set of zones may be provided and a network administrator may be provided with the capability to modify and/or customize the default set of zones. In some embodiments, a default set of zones may include: a trusted partner zone; an intra-organization zone; a restricted zone; and an internet zone.

E-mails received from or being sent to domains that have been listed as trusted partners may be classified into the trusted partner zone. Thus, for example, an organization may have a trusted relationship with another organization and may treat e-mails sent from e-mail addresses having that organization's domain as trusted. As one possible example, if the trusted organization has a domain name "contoso.com," then all e-mails sent from the domain "contoso.com" may be classified into the trusted partner zone.

The inventors have recognized that when classifying an e-mail into a zone based on the e-mail address and/or e-mail address domain of the sender, it may be useful to verify that the e-mail was actually sent from that address or domain. That is, the inventors have appreciated that it is possible to spoof the e-mail address of a sender, such that it appears to have been sent from a trusted domain, when in fact it was sent from an untrusted and/or malicious third party. Thus, in some embodiments, an e-mail that appears to have been sent from a trusted partner may be treated as coming from a trusted domain if it can be verified that the e-mail was actually sent from that domain (e.g., based on a certificate from a trusted certificate authority, a digital signature, or other verification technique).

Intra-organization e-mails (i.e., e-mails sent from one user in the enterprise to another user in the enterprise) may be classified into the intra-organization zone. E-mails identified as being spam or containing a virus or worm, or e-mails identified as being from an e-mail address, IP address, or domain that has been listed as restricted may be classified into the restricted zone. E-mails that don't belong in any of the above zones may be classified in the Internet zone.

In the illustrative zone classification scheme discussed above, e-mails received from or being sent to trusted partners may be classified into the trusted partner zone. Thus, as should be appreciated from this example, an e-mail may be classified into a zone based on the sender or a recipient of the e-mail. In such cases, it should be appreciated that when an e-mail message is being sent to multiple recipients, it may be treated as a separate e-mail message with respect to each of those recipients. That is, for example, if an e-mail message is being sent to three different recipients, it may be considered as being three separate e-mail messages, each being sent to one of the three recipients, and each of these three e-mail messages may be separately classified into an e-mail zone.

When classifying an e-mail based on the sender and/or recipients, it is frequently useful to define groups of senders or recipients. For example, as discussed above, a trusted partners e-mail zone may be used for e-mails received from or being sent to a trusted partner. In this respect, it may be useful to define a group of e-mail addresses or domain names of trusted partners. Thus, in some embodiments, a directory service, such as for example, Active Directory™ sold by Microsoft Corporation of Redmond, Wash., may be used to define groups of senders and/or recipients which may be used in classifying e-mails and/or applying policies to e-mails.

As discussed above, each zone may have associated with any suitable policy or policies, such that when an e-mail is classified into a zone, the policy or policies associated with the zone are applied to the e-mail. Any suitable policy or polices may be applied to e-mails classified into each zone. For example, information protection policies related to whether encryption is to be applied to an e-mail, filtering policies that relate to whether spam filtering or virus scanning is to be applied to an e-mail, mail flow policies that define whether an e-mail is permitted to be sent or received and/or any other type of policy may be applied. In addition, the policy may be applied and policy actions may be taken at the e-mail server, the e-mail client, or both the e-mail server and the e-mail client.

Figure 2:
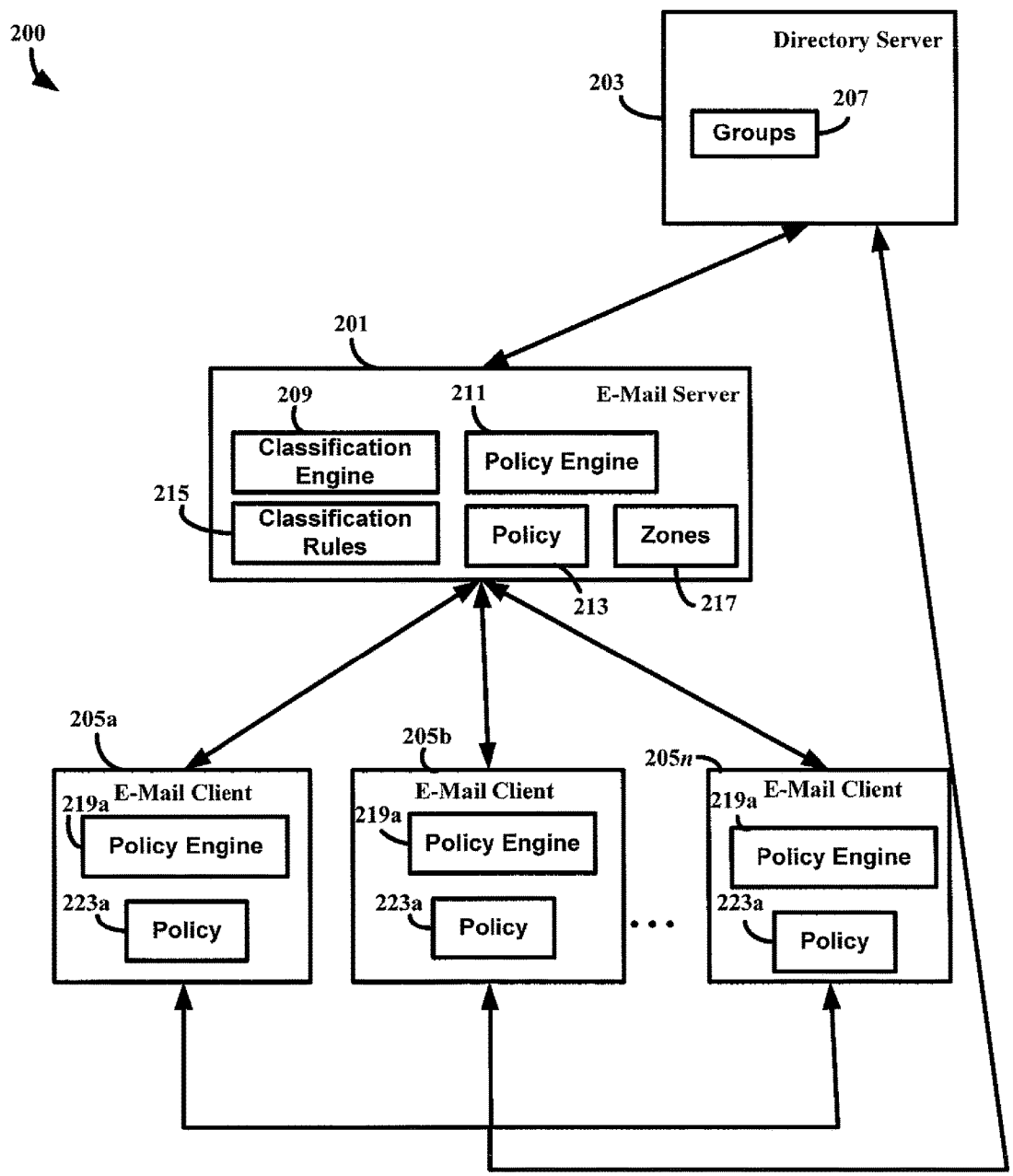
FIG. 2 is a block diagram of computer system in which e-mail messages to be sent and e-mail messages that have been received may be classified, in accordance with some embodiments.

FIG. 2 shows an illustrative computer system 200 comprising an e-mail server 201, a directory server 203, and a plurality of e-mail clients 205a, 205b, . . . 205n. As shown in FIG. 2, server 201 comprises a classification engine 209 and a policy engine 211. Server 201 also stores information (i.e., zones 213) that defines what zones are to be used in classifying e-mails. Thus, the information stored in zones 213 defines the "buckets" into which e-mail are to be classified. Server 203 also stores classification rules 215, which are the rules that classification engine uses to classify an e-mail into one of the defined zones, and policies 217, which define the policies that policy engine applies to e-mails, once they are classified into a zone.

Each of clients 205 has a classification engine 221 for classifying e-mails and a policy engine 219 for applying policy to e-mail messages. Each client 205 also stores policy information 223 that policy engine 219 uses to determine the policy to be applied to an e-mail.

Directory server 203 stores group information 203, which indicates which users, e-mail addresses, or domains belong to particular groups. Server 201 and clients 205 may communicate with directory server to obtain group information 207 and use this information in determine into which zone an e-mail is to be classified or what policy actions to perform.

Figure 3:
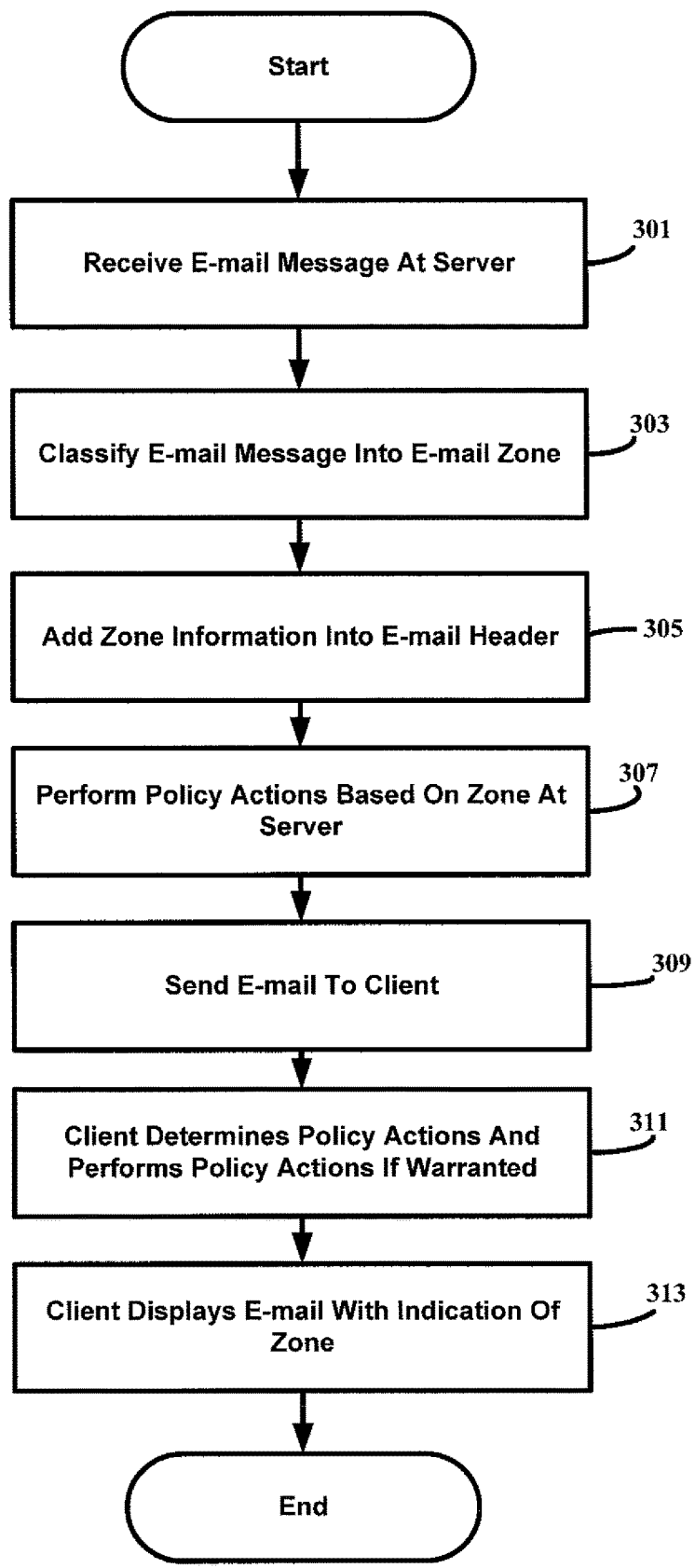
FIG. 3 is a flow chart of a process for classifying a received e-mail message and applying policy in response to the classification, in accordance with some embodiments'

FIG. 3 shows a process that may be used in computer system 200, in some embodiments, for classifying received e-mails and taking policy actions on received e-mails. The process begins at act 301, where e-mail server 201 receives an e-mail message either from a sender external to the enterprise (e.g., via the internet) or from an internal sender. The process next continues to act 303, where classification engine 209 of server 201 uses classification rules 215 and zone information 213 to classify the e-mail into a zone. In some embodiments, depending on the classification rules, server 201 may obtain group information 207 from directory server 203 to determine into which zone to classify an e-mail.

After act 303, the process continues to act 305, where server 201 adds information into the header of the e-mail that indicates the zone into which the e-mail was classified in act 303. The process next continues to act 307, where policy engine 211 performs any policy actions that are warranted based on policy information 217. In some embodiments, depending on the content of policy information 217, server 201 may obtain group information 207 from directory server 203 to determine the policy to be applied to an e-mail.

Any suitable policy actions may be taken. For example, for e-mails classified into the "Trusted Partner" zone or "Intra-Organization" zone, server 201 may skip "spam" filtering or virus scanning, whereas for e-mails classified into the "Internet" zone, the policy may specify that "spam" filtering and virus scanning is to be performed. As another example, e-mail attachment size limits may be imposed on e-mails classified into the "Internet" zone, such that e-mails with attachments that exceed the size limits are bounced, whereas no e-mail attachment size limits or less restrictive limits may be imposed on e-mails classified into the "Trusted Partner" zone or "Intra-Organization" zone. As yet another example, e-mails classified into the "Restricted" zone may be dropped or may be subject to SPAM quarantine.

The above-described policies are merely examples of policies that may be applied to an e-mail based upon the zone into which it is classified. Many other types of policies are possible, and the invention is not limited to use with any particular policies or policy types. In this respect, it should be appreciated that the policies applied to e-mails may be configured by a network administrator and any suitable policies may be used.

The process next continues to act 309, where server 201 sends the e-mail to the client 205 of the intended recipient of the e-mail. In some embodiments, this may be accomplished using a "pull" technique, wherein each client 205 is configured to periodically poll server 201. When polled by a client 205, if server 201 has received any e-mail messages for the user of that client, then these e-mail messages are downloaded to the client. It should be appreciated that the invention is not limited to using such a "pull" technique, as in some embodiments e-mail server 201 may use a "push" technique, whereby, rather than being polled by clients 205, server 201 actively contacts a client 205 when it has received one or more e-mail messages intended for the user of that client.

After act 309, the process continues to act 311, where policy engine 219 of the client 205 that downloaded the e-mail accesses the policy information stored thereon and the zone information added to the header of the e-mail by server 201, and determines whether any policy actions are to be taken. If it is determined that any policy actions are to be taken, policy engine performs those actions or causes those actions to be performed.

Any suitable policy actions may be performed by the client. For example, based on the zone classification, the e-mail may be stored in a particular e-mail folder. As another example, the policy information may specify, based on the zone information, that that calendar reminders or tasks are to be generated, and/or other local actions on the client computer are to be performed.

The above-described policies are merely examples of policies that may be applied to an e-mail based upon the zone into which it is classified. Many other types of policies are possible, and the invention is not limited to use with any particular policies or policy types. In this respect, it should be appreciated that the policies applied to e-mails at the client may be configured by a user of the client and/or the network administrator and any suitable policies may be used.

The process then continues to act 313, where the client 205 displays the e-mail to the user of the client. In some embodiments, this act may be performed, for example, into a user action that indicates the user's desire that the e-mail be displayed. For example, the user may select the e-mail (e.g., using a mouse pointer) and/or take some other action indicating a desire that the e-mail be displayed.

The client may display the e-mail in a manner that conveys the zone information into which the e-mail was classified to the user. For example, the displayed e-mail may have a zone icon and/or associated text that indicates the zone into which the e-mail was classified. Any other of a variety of techniques may be used to convey the zone information, including, for example, using colors to color portions of the e-mail (e.g., a status bar at the top of the displayed e-mail message) depending on the zone into which the e-mail has been classified, playing an audible notification indicative of the zone, and/or any other suitable technique that conveys zone information.

In the example process of FIG. 3, policy is applied at both the e-mail server and the e-mail client. However, the invention is not limited in this respect as, in some embodiments, policy may be applied only at the client, with in other embodiments policy may be applied only at the server.

Figure 4:
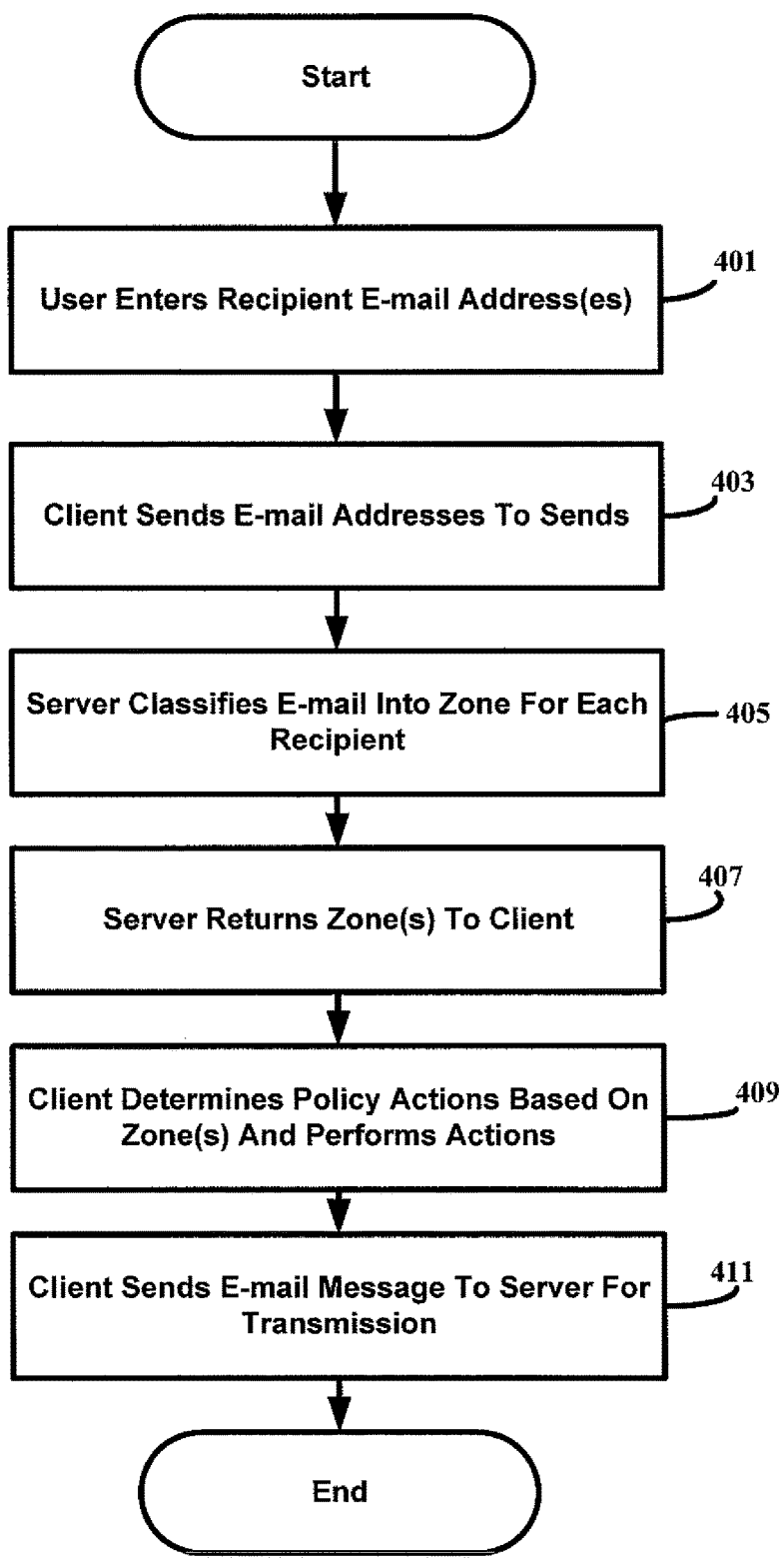
FIG. 4 is a flow chart of a process for classifying an e-mail to be sent, and applying policy in response to the classification, in accordance with some embodiments.

FIG. 4 shows an illustrative process that may be used in computer system 200, in some embodiments, to classify an e-mail that is being composed to be sent to one or more recipients and to perform policy actions on the e-mail. The recipient(s) may include one or more recipients external to the enterprise and/or one or more recipients internal to the enterprise. The process begins at act 401, where a user composing an e-mail via an e-mail client (e.g. one of clients 205), inputs one or more recipient e-mail addresses for the e-mail. The process then continues to act 403, where the client sends the recipient e-mail address(es) to server 201 for classification. In response, at act 405, the server classifies the e-mail into a zone based on the recipient e-mail address(es).

As discussed above, when there are multiple recipient e-mail addresses, the e-mail message may be treated as multiple separate e-mail messages, each addressed to one of the multiple recipients. Thus, at act 405, server 201 may perform a separate zone classification for each recipient e-mail addressed received in act 403. For example, if there are three recipients, where the first recipient is a trusted partner, the second recipient is an internal recipient, and the third recipient is an external recipient who is not a trusted partner, server 201 may classify the e-mail message to the first recipient as belonging in the "Trusted Partner" zone, may classify the e-mail message to the second recipient as belonging in the "Intra-Organization Zone," and may classify the e-mail message to the third recipient as belonging in the "Internet Zone."

After act 405, the process continues to act 407, where the server returns the zone classifications for each recipient back to the client 205. In some embodiments, the client may display an indication of the zone classification for the e-mail message in the displayed e-mail message. In situations where there are multiple recipients and different e-mail zone classifications for different recipients, an indication of the zone classification for each recipient may be displayed in the e-mail message.

The process next continues to act 409, where based on the received zone classifications, the policy engine on the client determines, using policy information 223, whether any policy actions are warranted and, if so, performs the policy action(s).

Client 205 may take any suitable policy action based on the classification. For example, if it is determined that one of the recipients is in the "Internet" zone, then the client may scan the e-mail (e.g., using keyword scanning techniques) to determine if it contains confidential information and, if it is determined that the e-mail contains confidential information, may block sending of the e-mail. As another example, if one of the recipients is in the "Internet" zone and the e-mail includes an attachment, the policy information may specify that the client is to prompt the user to verify that the user wishes to send the attachment to this recipient. This reduces the risk of a user accidentally sending a confidential attachment to an unintended recipient.

The above-described policies are merely examples of policies that may be applied to an e-mail based upon the zone into which it is classified. Many other types of policies are possible, and the invention is not limited to use with any particular policies or policy types. In this respect, it should be appreciated that the policies applied to e-mails at the client may be configured by a user of the client and/or the network administrator and any suitable policies may be used.

The process then continues to act 411, where the e-mail client sends the e-mail message to server 201 for transmission to the recipients. It should be appreciated that when server 201 receives the e-mail message for transmission, it may perform the process discussed above in connection FIG. 3 associated with sending an e-mail message.

Figure 5:
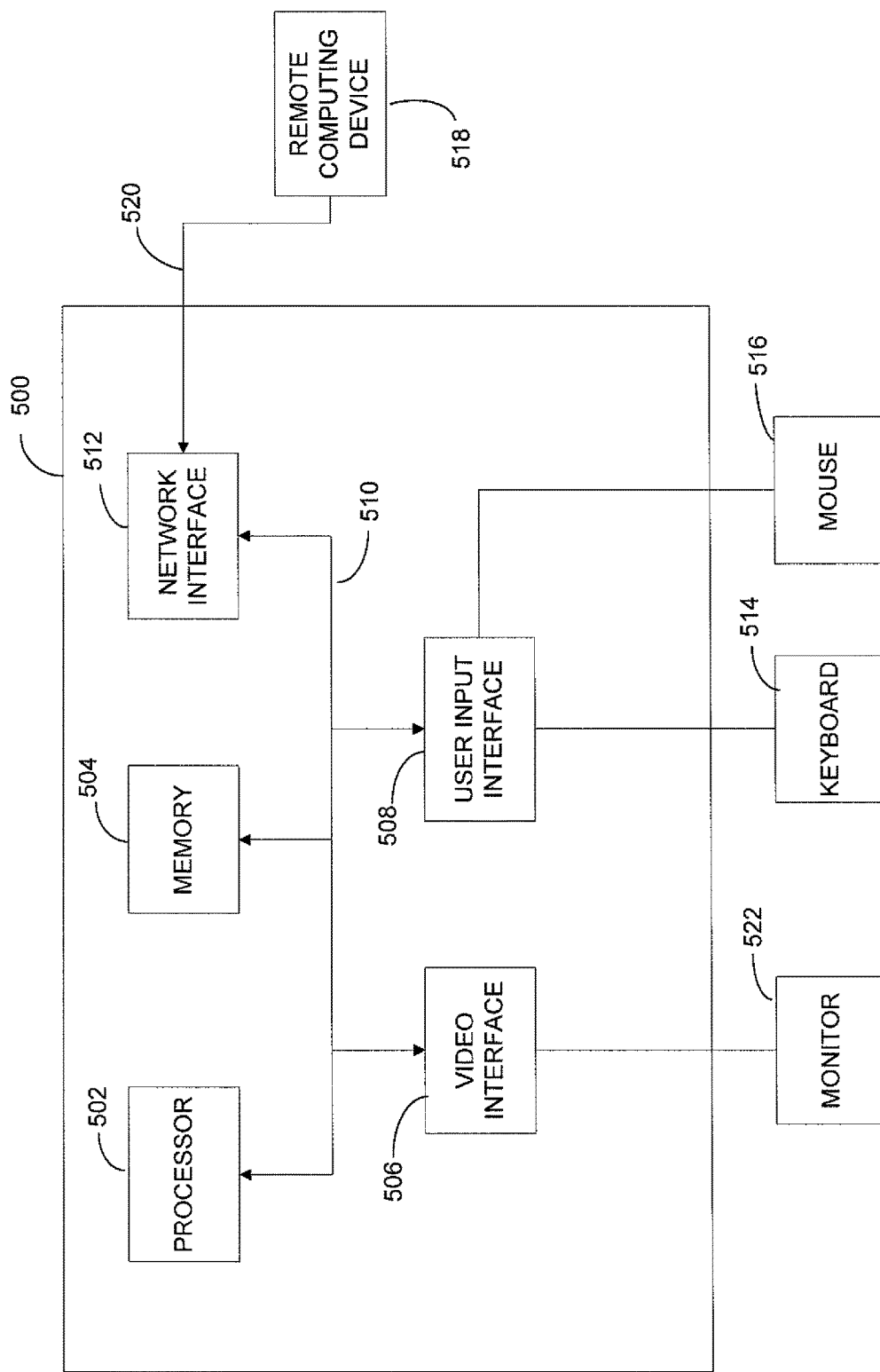
FIG. 5 is a block diagram of a computer on which some processes related to classifying an e-mail message and applying policy in response to the classification may be implemented.

FIG. 5 shows a schematic block diagram of an illustrative computer 500 on which aspects of the invention may be implemented. Only illustrative portions of the computer 500 are identified for purposes of clarity and not to limit aspects of the invention in any way. For example, the computer 500 may include one or more additional volatile or non-volatile memories (which may also be referred to as storage media), one or more additional processors, any other user input devices, and any suitable software or other instructions that may be executed by the computer 500 so as to perform the function described herein.

In the illustrative embodiment, the computer 500 includes a system bus 510, to allow communication between a central processing unit 502 (which may include one or more hardware general purpose programmable computer processors), a tangible memory 504, a video interface 506, a user input interface 508, and a network interface 512. The network interface 512 may be connected via network connection 520 to at least one remote computing device 518. Peripherals such as a monitor 522, a keyboard 514, and a mouse 516, in addition to other user input/output devices may also be included in the computer system, as the invention is not limited in this respect.

As may be appreciated from the discussion above, e-mail server 201 may be an application program that executes on a computer such as computer 500. Thus, central processing unit 502 may perform the process steps in FIGS. 3 and 4 that are described as being performed by server 201, classification engine 209 of server 201, and/or policy engine 211 of server 201, and memory 504 may store computer program instructions (that are accessed and executed by the central processing unit) for performing such processing steps. Memory 504 may also be used to store information 213, 215 and 217.

Similarly, each of clients 205 may be an application program that executes on a computer such as computer 500. In this respect, central processing unit 502 may perform the process steps in FIGS. 3 and 4 that are described as being performed by a client 205, and memory 504 may store computer program instructions (that are accessed and executed by the central processing unit) for performing such processing steps. Memory 504 may also be used to store information 223.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items

What is claimed is:

1. A method comprising:
   displaying an electronic mail (e-mail) message by an e-mail client application program executing on a computer, the displayed e-mail message to be sent from an e-mail address domain that is internal to an organization to a plurality of recipient e-mail addresses including:
   a first recipient e-mail address which is external to the organization,
   a second recipient e-mail address which is internal to the organization, and
   a third recipient e-mail address which is external to the organization;
   sending, by the e-mail client application program, the plurality of recipient e-mail addresses to an e-mail server of the organization, wherein the e-mail server of the organization is configured to determine:
   the first recipient e-mail address which is external to the organization includes an e-mail address domain that has been listed by the organization as a trusted partner domain,
   the second recipient e-mail address which is internal to the organization includes an e-mail address domain that is internal to the organization, and the third recipient e-mail address which is external to the organization includes an e-mail address domain that has not been listed by the organization as a trusted partner domain and that has not been listed by the organization as a restricted domain;

receiving, by the e-mail client application program from the e-mail server of the organization, different e-mail zone classifications including:
  a trusted partner zone for the first recipient e-mail address which is external to the organization,
  an intra-organization zone for the second recipient e-mail address which is internal to the organization, and
  a general internet zone for the third recipient e-mail address which is external to the organization;

adding, by the e-mail client application program, zone information indicating the different e-mail zone classifications into a header of the displayed e-mail message;

visually displaying, by the e-mail client application program, an indication of each different e-mail zone classification in the displayed e-mail message;

processing, by the e-mail client application program, the displayed e-mail message as multiple separate e-mail messages that are classified based on the zone information, the multiple separate e-mail messages including:
  a first e-mail message which is addressed only to the first recipient e-mail address and which is classified into the trusted partner zone,
  a second e-mail message which is addressed only to the second recipient e-mail address and which is classified into the inter-organization zone, and
  a third e-mail message which is addressed only to the third recipient e-mail address and which is classified into the general internet zone;

accessing, by a policy engine of the e-mail client application program, policy information stored in memory of the computer;

determining, by the policy engine, policy actions specified by the policy information that are to be performed on the third e-mail message based on classification of the third e-mail message into the general internet zone, wherein the policy actions include at least scanning contents of the third e-mail message for confidential information and blocking the third e-mail message from being sent when confidential information is contained in the third e-mail message;

sending, by the e-mail client application program to the e-mail server of the organization, the first e-mail message without the policy actions being performed on the first e-mail message;

sending, by the e-mail client application program to the e-mail server of the organization, the second e-mail message without the policy actions being performed on the second e-mail message; and performing, by the policy engine, the policy actions on the third e-mail message.

2. The method of claim 1, wherein the indication comprises an icon for each different e-mail zone classification.

3. The method of claim 1, wherein the indication comprises a text label for each different e-mail zone classification.

4. The method of claim 1, further comprising:
sending, by the e-mail client application program to the e-mail server of the organization, the third e-mail message when the scanning indicates that no confidential information is contained in the third e-mail message.

5. The method of claim 1, wherein:
the displayed e-mail message comprises an attachment, and
the policy actions include prompting a user of the e-mail client application program to verify that the attachment is to be sent to the third recipient e-mail address.

6. The method of claim 1, wherein:
the policy actions include encrypting the third e-mail message when the scanning indicates that no confidential information is contained in the third e-mail message.

7. A computer-readable storage device storing computer-executable instructions that, when executed by a computing device, cause the computing device to perform a method comprising:
displaying an electronic mail (e-mail) message by an e-mail client application, the displayed e-mail message to be sent from an e-mail address domain that is internal to an organization to a plurality of recipient e-mail addresses including:
  a first recipient e-mail address which is external to the organization,
  a second recipient e-mail address which is internal to the organization, and
  a third recipient e-mail address which is external to the organization;

sending, by the e-mail client application program, the plurality of recipient e-mail addresses to an e-mail server of the organization, wherein the e-mail server of the organization is configured to determine:
  the first recipient e-mail address which is external to the organization includes an e-mail address domain that has been listed by the organization as a trusted partner domain,
  the second recipient e-mail address which is internal to the organization includes an e-mail address domain that is internal to the organization, and
  the third recipient e-mail address which is external to the organization includes an e-mail address domain that has not been listed by the organization as a trusted partner domain and that has not been listed by the organization as a restricted domain;

receiving, by the e-mail client application program from the e-mail server of the organization, different e-mail zone classifications including:
  a trusted partner zone for the first recipient e-mail address which is external to the organization,
  an intra-organization zone for the second recipient e-mail address which is internal to the organization, and
  a general internet zone for the third recipient e-mail address which is external to the organization;

adding, by the e-mail client application program, zone information indicating the different e-mail zone classifications into a header of the displayed e-mail message;

visually displaying, by the e-mail client application program, an indication of each different e-mail zone classification in the displayed e-mail message;

processing, by the e-mail client application program, the displayed e-mail message as multiple separate e-mail messages that are classified based on the zone information, the multiple separate e-mail messages including:

a first e-mail message which is addressed only to the first recipient e-mail address and which is classified into the trusted partner zone,
a second e-mail message which is addressed only to the second recipient e-mail address and which is classified into the inter-organization zone, and
a third e-mail message which is addressed only to the third recipient e-mail address and which is classified into the general internet zone;
accessing, by a policy engine of the e-mail client application program, policy information stored in memory of the computing device;
determining, by the policy engine, policy actions specified by the policy information that are to be performed on the third e-mail message based on classification of the third e-mail message into the general internet zone, wherein the policy actions include at least scanning contents of the third e-mail message for confidential information and blocking the third e-mail message from being sent when confidential information is contained in the third e-mail message;
sending, by the e-mail client application program to the e-mail server of the organization, the first e-mail message without the policy actions being performed on the first e-mail message;
sending, by the e-mail client application program to the e-mail server of the organization, the second e-mail message without the policy actions being performed on the second e-mail message; and
performing, by the policy engine, the policy actions on the third e-mail message.

8. The computer-readable storage device of claim 7, further comprising:
sending, by the e-mail client application program to the e-mail server of the organization, the third e-mail message when the scanning indicates that no confidential information is contained in the third e-mail message.

9. The computer-readable storage device of claim 7, wherein:
the displayed e-mail message comprises an attachment, and
the policy actions include prompting a user of the e-mail client application program to verify that the attachment is to be sent to the third recipient e-mail address.

10. The computer-readable storage device of claim 7, wherein the policy information is configurable by a user of the computing device.

11. The computer-readable storage device of claim 7, wherein the indication comprises an icon for each different e-mail zone classification.

12. The computer-readable storage device of claim 7, wherein the indication comprises a text label for each different e-mail zone classification.

13. The computer-readable storage device of claim 7, wherein:
the policy actions include encrypting the third e-mail message when the scanning indicates that no confidential information is contained in the third e-mail message.

14. A computer system comprising:
a processor configured to execute processor-executable instructions; and
memory storing processor-executable instructions for causing an electronic mail (e-mail) client application program to:
display an e-mail message to be sent from an e-mail address domain that is internal to an organization to a plurality of recipient e-mail addresses including:
a first recipient e-mail address which is external to the organization,
a second recipient e-mail address which is internal to the organization, and
a third recipient e-mail address which is external to the organization;
send the plurality of recipient e-mail addresses to an e-mail server of the organization, wherein the e-mail server of the organization is configured to determine:
the first recipient e-mail address which is external to the organization includes an e-mail address domain that has been listed by the organization as a trusted partner domain,
the second recipient e-mail address which is internal to the organization includes an e-mail address domain that is internal to the organization, and
the third recipient e-mail address which is external to the organization includes an e-mail address domain that has not been listed by the organization as a trusted partner domain and that has not been listed by the organization as a restricted domain;
receive, from the e-mail server of the organization, different e-mail zone classifications including:
a trusted partner zone for the first recipient e-mail address which is external to the organization,
an intra-organization zone for the second recipient e-mail address which is internal to the organization, and
a general internet zone for the third recipient e-mail address which is external to the organization;
add, by the e-mail client application program, zone information indicating the different e-mail zone classifications into a header of the displayed e-mail message;
visually display an indication of each different e-mail zone classification in the displayed e-mail message;
process the displayed e-mail message as multiple separate e-mail messages that are classified based on the zone information, the multiple separate e-mail messages including:
a first e-mail message which is addressed only to the first recipient e-mail address and which is is classified into the trusted partner zone,
a second e-mail message which is address only to the second recipient e-mail address and which is classified into the inter-organization zone, and
a third e-mail message which is addressed only to the third recipient e-mail address and which is classified into the general internet zone;
access, via a policy engine of the e-mail client application program, policy information stored in the memory;
determine, via the policy engine, policy actions specified by the policy information that are to be performed on the third e-mail message based on classification of the third e-mail message into the general internet zone, wherein the policy actions include at least scanning contents of the first e-mail message for confidential information and blocking the third e-mail message from being sent when confidential information is contained in the third e-mail message;
send, via the e-mail client application program to the e-mail server of the organization, the first e-mail message without the policy actions being performed on the first e-mail message;

send, to the e-mail server of the organization, the second e-mail message without the policy actions being performed on the second e-mail message; and perform, via the policy engine, the policy actions on the third e-mail message.

15. The computer system of claim 14, wherein:

the policy actions include encrypting the third e-mail message when the scanning indicates that no confidential information is contained in the third e-mail message.

16. The computer system of claim 14, wherein the indication comprises an icon for each different e-mail zone classification.

17. The computer system of claim 14, wherein:

the displayed e-mail message comprises an attachment, and the policy actions include prompting a user of the e-mail client application program to verify that the attachment is to be sent to the third recipient e-mail address.

18. The computer system of claim 14, wherein the indication comprises a text label for each different e-mail zone classification.

19. The computer system of claim 14, wherein the memory further stores processor-executable instructions for causing the e-mail client application program to:

send, to the e-mail server of the organization, the third e-mail message when the scanning indicates that no confidential information is contained in the third e-mail message.

20. The computer system of claim 17, wherein:

the policy actions include blocking the third e-mail message from being sent when the attachment exceeds a threshold size limit.

* * * * *